US009165043B2

(12) United States Patent
Jin et al.

(10) Patent No.: US 9,165,043 B2
(45) Date of Patent: Oct. 20, 2015

(54) LOGICAL OBJECT SEARCH FRAMEWORK AND APPLICATION PROGRAMMING INTERFACE

(76) Inventors: Maobing Jin, San Jose, CA (US); Tariq Rauf, San Jose, CA (US)

( * ) Notice: Subject to any disclaimer, the term of this patent is extended or adjusted under 35 U.S.C. 154(b) by 925 days.

(21) Appl. No.: 12/625,889

(22) Filed: Nov. 25, 2009

(65) Prior Publication Data

US 2011/0125773 A1 May 26, 2011

(51) Int. Cl.
*G06F 7/00* (2006.01)
*G06F 17/30* (2006.01)

(52) U.S. Cl.
CPC .............................. *G06F 17/30545* (2013.01)

(58) Field of Classification Search
CPC .................................................. G06F 17/30545
See application file for complete search history.

(56) References Cited

U.S. PATENT DOCUMENTS

| | | | | |
|---|---|---|---|---|
| 5,978,791 | A * | 11/1999 | Farber et al. | 707/640 |
| 6,260,044 | B1 * | 7/2001 | Nagral et al. | 707/697 |
| 6,381,594 | B1 * | 4/2002 | Eichstaedt et al. | 1/1 |
| 7,185,192 | B1 * | 2/2007 | Kahn | 713/155 |
| 7,213,011 | B1 | 5/2007 | Das | |
| 7,693,900 | B2 * | 4/2010 | Wilmering et al. | 707/713 |
| 7,818,285 | B1 * | 10/2010 | Klatt et al. | 707/600 |
| 8,099,420 | B2 * | 1/2012 | Farber et al. | 707/758 |
| 8,819,046 | B2 * | 8/2014 | Warren et al. | 707/760 |
| 2002/0026443 | A1 * | 2/2002 | Chang et al. | 707/10 |
| 2003/0115484 | A1 * | 6/2003 | Moriconi et al. | 713/201 |
| 2004/0024764 | A1 * | 2/2004 | Hsu et al. | 707/9 |
| 2004/0088158 | A1 * | 5/2004 | Sheu et al. | 704/9 |
| 2004/0193635 | A1 * | 9/2004 | Hsu et al. | 707/102 |
| 2004/0220896 | A1 | 11/2004 | Finlay et al. | |
| 2006/0020933 | A1 * | 1/2006 | Pasumansky et al. | 717/140 |
| 2007/0044144 | A1 * | 2/2007 | Knouse et al. | 726/8 |
| 2008/0077598 | A1 * | 3/2008 | Wilmering et al. | 707/100 |
| 2008/0126393 | A1 | 5/2008 | Bossman et al. | |
| 2008/0183656 | A1 * | 7/2008 | Perng et al. | 707/2 |
| 2008/0313131 | A1 | 12/2008 | Friedman et al. | |
| 2008/0319957 | A1 | 12/2008 | Muralidhar et al. | |
| 2010/0063968 | A1 * | 3/2010 | Sheu et al. | 707/736 |
| 2010/0082656 | A1 * | 4/2010 | Jing et al. | 707/760 |
| 2013/0166569 | A1 * | 6/2013 | Navas | 707/747 |

OTHER PUBLICATIONS

Bertino E. et al., An Access Control Model for Video Database Systems, Nov. 2000, ACM, pp. 336-343.*
Martin Peim et al., "Query Processing with Description Logic Ontologies over Object-Wrapped Databases", SSDBM Proceedings of the 14th International Conference on Scientific and Statistical Database Management, p. 27-36, 2002, ISBN: 1099-3371, 0-7695-1632-7, IEEE Computer Society Washington, DC, USA.
"XQuery 1.0: An XML Query Language W3C Recommendation" Jan. 23, 2007, W3C, (MIT, ERCIM, Keio) pp. 1-193.
"XQuery Tutorial", w3schools.com, http://w3schools.com/xquery_intro.asp Jun. 2006.

* cited by examiner

*Primary Examiner* — Taelor Kim
(74) *Attorney, Agent, or Firm* — Terry Carroll; Edell, Shapiro & Finnan, LLC

(57) ABSTRACT

A method, computer program product, and system for executing and administering queries in a data management system, and particularly a relational data management system. Logical objects can be queried by providing a translation from a logical query in a pre-defined logical schema to a physical query against the physical data management system, such as by translating a database query constructed using an Object Query Language (OQL) into a query in Structured Query Language (SQL) without the user needing to know the details of the physical data management system such as the structure of the underlying relational databases.

24 Claims, 3 Drawing Sheets

~210 item.category.hierarchy.name = 'Electronics Classification'
Item.category.name = 'Television'
Item.location.name = 'San Antonio Metropolitan'
Item.location.price = < 1250
Item.location.availability = 'in-stock' or 'shippable'

| Product Table | | | | | |
|---|---|---|---|---|---|
| ID | Vendor | Model | Features | Price | ShipZone |
| 365 | Panasonic | PS101 | Plasma, 36" | 999 | 3, 4, 5 |
| 366 | Panasonic | PT109 | Plasma, 42", Internet-Enabled | 1299 | 2, 3 |
| 367 | Sony | 550e | LCD, 30" | 1099 | 2, 3, 4 |
| 368 | Sony | 590a | LCD, 36" | 1249 | 4, 5 |
| ... | ... | ... | ... | ... | ... |
| 1478 | USPlastic | 110 | Wheeled, Heavy duty plastic | 69 | 1, 3, 4 |

FIG. 2B

LOGICAL OBJECT SEARCH FRAMEWORK AND APPLICATION PROGRAMMING INTERFACE

BACKGROUND

1. Technical Field

The present invention relates generally to a logical object search framework and application programming interface (API), and more particularly to using a logical object search framework and API to execute and administer queries in a data management system.

2. Discussion of Related Art

In today's information-driven economy, the ability of an enterprise to efficiently store, update, and use information can be critical to the enterprise's ability to serve its customers and compete in the economy. An entity such as a business enterprise can model a concept of an entity relating to that enterprise and use such modeling information to maintain and use information relating to that entity. Some examples of entities that can be modeled by an enterprise include customer, product, bill of materials etc. An enterprise can maintain and model data relating to these entities in either a relational programming environment or in an object-oriented environment such as the commonly used Java environment. In a relational system, data is maintained in one or more data tables, where each row refers to an instance of the entity. In an object system, an entity concept is modeled using classes, where each instance of the class, called an object, refers to an instance of the entity, with characteristics of those objects being known as "attributes" of that object. In order to bridge the two systems, object-relational modeling (ORM) techniques are used to enable an enterprise to use data maintained in relational databases in an object-oriented environment.

BRIEF SUMMARY

Accordingly, embodiments of the present invention include a method of processing a query, comprising providing a pre-defined logical schema to a user of a database system comprising at least two relational database entities storing data therein, receiving a logical query for data stored in the database system from the user, where the logical query is written in an object-oriented query language according to the pre-defined logical schema, and comprises two or more predicates and an operator specifying an action to take with one or more of the predicates, in response to receiving the logical query, interpreting the logical query using the pre-defined logical schema to determine which of the relational database entities is associated with each predicate, requesting each relational database entity to translate each of its associated predicates, receiving a translated predicate query for each predicate from its associated relational database entity, where each translated predicate query is written in a relational query language and is a translation of one of the object-oriented predicates in the logical query, combining each received translated predicate query into a master query using the operator, executing the master query against the database system, in response to executing the master query, receiving a query result set from the database system, and providing the query result set to the user.

Other embodiments of the present invention include a computer program product comprising a computer useable medium having a computer readable program, where the computer readable program when executed on a computer causes the computer to provide a pre-defined logical schema to a user of a database system comprising at least two relational database entities storing data therein, receive a logical query for data stored in the database system from the user, where the logical query is written in an object-oriented query language according to the pre-defined logical schema, and comprises two or more predicates and an operator specifying an action to take with one or more of the predicates, in response to receiving the logical query, interpret the logical query using the pre-defined logical schema to determine which of the relational database entities is associated with each predicate, request each relational database entity to translate each of its associated predicates, receive a translated predicate query for each predicate from its associated relational database entity, where each translated predicate query is written in a relational query language and is a translation of one of the object-oriented predicates in the logical query, combine each received translated predicate query into a master query using the operator, execute the master query against the database system, in response to executing the master query, receive a query result set from the database system, and provide the query result set to the user.

Still other embodiments of the present invention include a system comprising a memory having a pre-defined logical schema stored thereon, a database memory having at least two relational database entities storing data thereon and a processor configured with logic to provide the pre-defined logical schema to a user, receive a logical query for stored data from the user, where the logical query is written in an object-oriented query language according to the pre-defined logical schema, and comprises two or more predicates and an operator specifying an action to take with one or more of the predicates, in response to receiving the logical query, interpret the logical query using the pre-defined logical schema to determine which of the relational database entities is associated with each predicate, request each relational database entity to translate each of its associated predicates, receive a translated predicate query for each predicate from its associated relational database entity, where each translated predicate query is written in a relational query language and is a translation of one of the object-oriented predicates in the logical query, combine each received translated predicate query into a master query using the operator, execute the master query against the at least two relational database entities, in response to executing the master query, receive a query result set from the at least two relational database entities, and provide the query result set to the user.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIGS. 2A and 2B are schematic diagrams of an object-oriented search query and a relational data table according to an embodiment of the present invention.

DETAILED DESCRIPTION

Figure 1:
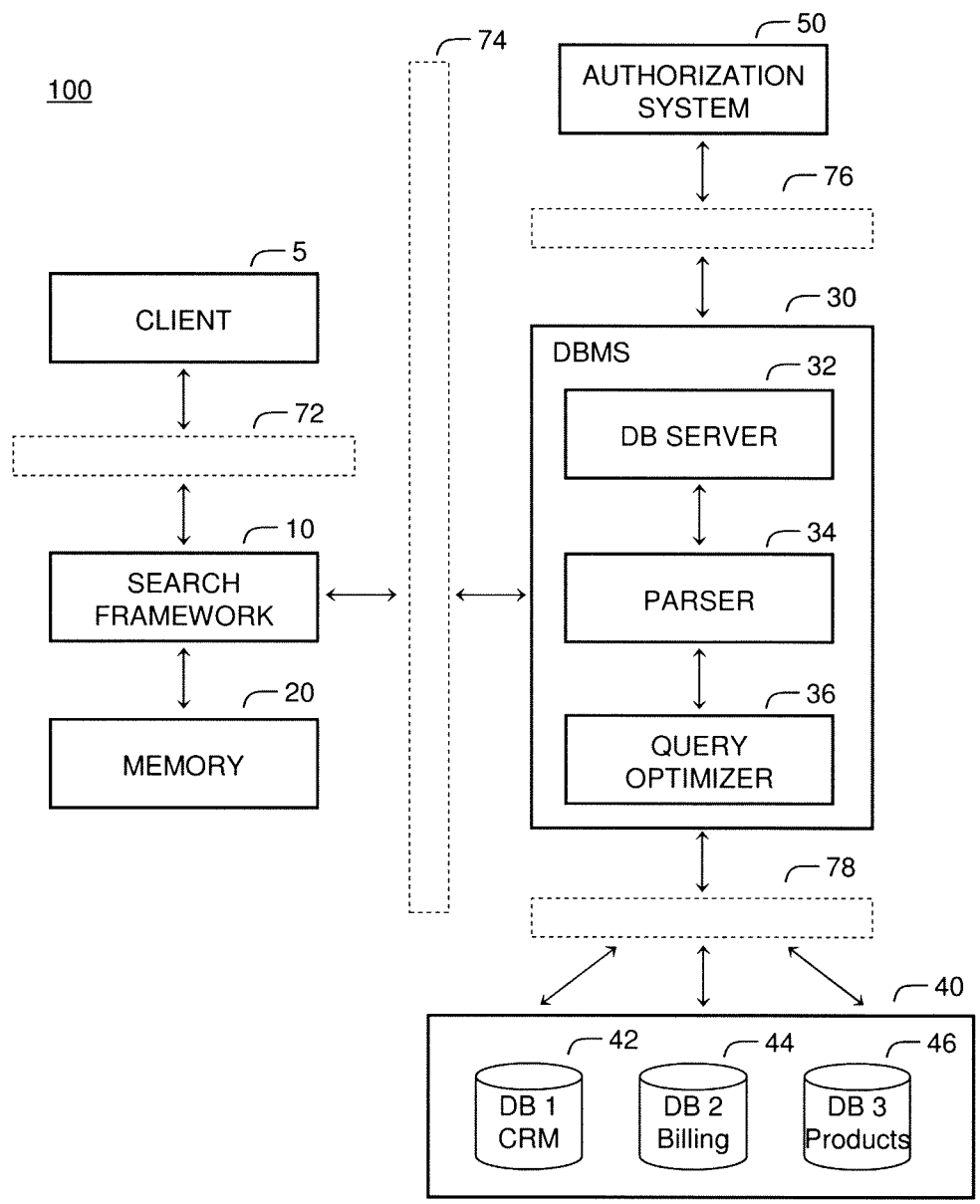
FIG. 1 is a block diagram illustrating an exemplary search framework and API used in a Master Data Management (MDM) system environment according to an embodiment of the present invention.

Referring now to the Figures, an exemplary system according to an embodiment of the present invention is illustrated in FIG. 1. The system shown in FIG. 1 is particularly suited to the execution and administration of master data retrieval in a Master Data Management (MDM) system. The system includes a search framework and API 10, memory 20, database management system (DBMS) 30, data storage system 40 containing data, and authorization system 50, all of which are connected over networks 72, 74, 76, 78 to each other and to clients 5. The system 100 may include additional servers, clients, and other devices not shown, and individual components of the system may occur either singly or in multiples, for example, there may be more than one data storage area in the system.

Generally, clients 5 provide an interface to the functions provided by the search framework and API 10, for example, mechanisms for querying the databases, etc. The end-user clients 5 may be implemented by any quantity of conventional or other computer systems or devices (e.g., computer terminals, personal computers (e.g., IBM®-compatible, Apple® Macintosh® computer, tablet, laptop, etc.), cellular telephone, personal data assistant (e.g., PALM® PRE™, TREO™ smartphone, iPhone® mobile digital device, etc.), and may include any commercially available operating system (e.g., AIX®, Linux®, OS_X®, Sun™ Solaris™, UNIX®, Windows®, etc.) and any commercially available or custom software (e.g., browser software, communications software, word processing software, etc.). These systems may include types of displays and input devices (e.g., keyboard, mouse, voice recognition, etc.) to enter and/or view information. (IBM® and AIX® are trademarks of International Business Machines Corporation; Apple®, Macintosh®, iPhone®, and OS X® are trademarks of Apple, Inc.; PALM®, PRE™, and TREO™ are trademarks of Palm, Inc.; Linux® is a trademark of Linus Torvalds; Sun™ and Solaris™ are trademarks of Sun Microsystems, Inc.; UNIX® is a trademark of The Open Group; and Windows® is a trademark of Microsoft Corporation.)

The search framework and API 10 may be implemented in the form of a processing system, or may be in the form of software. A processing system may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). If embodied in software, the search framework and API 10 may be available on a recordable medium (e.g., magnetic, optical, floppy, Digital Versatile Disc (DVD, Compact Disc (CM, etc.) or in the form of a carrier wave or signal for downloading from a source via a communication medium (e.g., bulletin board, network, Local Area Network (LAN), Wide Area Network (WAN), Intranet, Internet, etc.). For example, the search framework and API 10 can be implemented as software, for example one or more daemons, software modules, or APIs.

Memory 20 may be implemented by any conventional or other memory or storage device (e.g., Random Access Memory (RAM), cache, flash, etc.), and may include any suitable storage capacity. Memory 20 may store a pre-defined logical schema, logical queries, predicate queries, master queries, java filters, and result sets, as is further described below.

The DBMS 30 may be any suitable database management system, and may be a Master Data Management system such as IBM® InfoSphere® Master Data Management Server, Microsoft SQL Server® 2008 R2 Master Data Services, or Sun Master Data Management (MDM) Suite, for example. In the depicted embodiment, the DBMS comprises a database server 32, a query parser 34, and a query optimizer 36. (InfoSphere® is a trademark of International Business Machines Corporation.)

Data storage system 40 may be implemented by any quantity of any type of conventional or other databases (e.g., network, hierarchical, relational, object, etc.) or storage structures (e.g., files, data structures, web-based storage, disk or other storage, etc.). The databases or storage structures 42, 44, 46 may store any desired information arranged in any fashion (e.g., tables, hierarchical, relations, objects, etc.), and may store additional information such as metadata in addition to documents. For example, the databases or storage structures 42, 44, 46 may be any suitable data storage structure such as an enterprise data source (e.g., DB2®, Oracle®, IBM® Enterprise Content Management (ECM) systems, ERP systems, etc.), personal and intra-organization data sources (e.g., spreadsheets (e.g., Microsoft® Excel®), databases (e.g., Microsoft® Access®, MySQL™), SharePoint®, Quickr®, eXtensible Markup Language (XML), etc.), or web-based data sources such as public databases (e.g., tax records, real estate records, court documents, etc.) and the like. Authorization system 50 may be implemented by any suitable authorization or access control system, and may be a single system or individual systems associated with one or more data storage structure in the data storage system 40. (DB2® and Quickr® are trademarks of International Business Machines Corporation; Oracle® is a trademark of Oracle Corporation; Excel®, Access®, SharePoint® are trademarks of Microsoft Corporation; and MySQL™ is a trademark of Sun Microsystems, Inc.)

The networks 72, 74, 76, 78 may be implemented by any quantity of any suitable communications media (e.g., WAN, LAN, Internet, Intranet, wired, wireless, etc.). The computer systems of the present invention embodiments may include any conventional or other communications devices to communicate over the networks via any conventional or other protocols, and may utilize any type of connection (e.g., wired, wireless, etc.) for access to the network. It is understood that any of the client 5, search framework and API 10, memory 20, DBMS 30, data storage system 40, and authorization system 50 may be local to one or more components of system 100, or may be remote from and in communication with one or more other components of system 100 via one or more networks 72, 74, 76, 78.

In operation, the search framework and API 10 provides a way to query logical objects by providing a translation from a logical query in a pre-defined schema to a physical query against the physical data storage system 40. For example, the search framework and API 10 may translate a database query constructed using an Object Query Language (OQL) to a query in Structured Query Language (SQL) without the user needing to know the details of the physical data storage system 40 such as the structure of the underlying relational databases. In these embodiments, this translation is provided by means of mapping the relational schemas utilized in the data storage system 40 and DBMS 30 to a single pre-defined logical schema, for example a product classification with category hierarchies.

The pre-defined logical schema may take various forms, for example in a retail MDM system, the master data may be modeled in two or three dimensions, for example, product data, common categorization data, and location-specific data. Thus, a set of objects such as Item, Catalog, Spec, Category, Hierarchy and Location may be used to model the merchandise in these dimensions. Item may correspond to a product in a retail store, such as a television, and has a common set of basic attributes, which can be defined in 'Spec'. For management purposes, items can be grouped using a 'Catalog' object, which categorizes the items based on their general type, for example 'Books', 'Electronics', 'Garden Supplies', or 'Media'. Items in a catalog can be further grouped into 'Category', for example, 'Audio', 'Computers', 'Photo' or 'Televisions'. A category may have sub-categories, and so each category can be in a 'Hierarchy'. Each 'Category' has a set of basic attributes, which can be defined in 'Spec'. The items may also have location-specific attributes, and may also be grouped using a 'Location' object, which has a set of basic attributes, which can be defined in 'Spec'.

In this way, a set of logical objects (e.g., Item, Catalog, Spec, etc.) may be used to model any type of retail business system, or a different set of logical objects may be used to model any type of business or MDM system. The search framework and API 10 itself models the relationship between logical objects, but allows a developer or system administrator to specify the particular retrieval logic in each object. For example, the search framework and API 10 may model the relationship between 'Item', 'Category' and 'Hierarchy' as item.category.hierarchy.name='Electronics Classification', where a period is used to link two logical objects. This representation indicates that an item belongs to a category in the hierarchy 'Electronics Classification'.

The use of the pre-defined schema vastly simplifies the user's ability to run logical or business queries against physical databases of varying form, for example a single MDM system may integrate databases of multiple types from multiple vendors, without requiring the use of multiple database schemas to run a query. In the present embodiments the user need not know the details of the underlying physical databases, which reduces the cost of training and implementation for complex MDM systems.

For example, as shown in FIG. 2A, a database query 210 requesting a result set containing all televisions available in the San Antonio Metropolitan area with a price point of $1250 or less is constructed using an object-oriented query language and the pre-defined logical schema. The search framework and API 10 translates and facilitates running this search against the underlying relational database table 220 depicted in FIG. 2B, which maintains data in one or more data tables, where each row refers to an instance of the entity (e.g., a particular product), and each column refers to an attribute of the entity (e.g., the source vendor, the model number, the price, the available shipping zones for this product, etc.).

Figure 3:
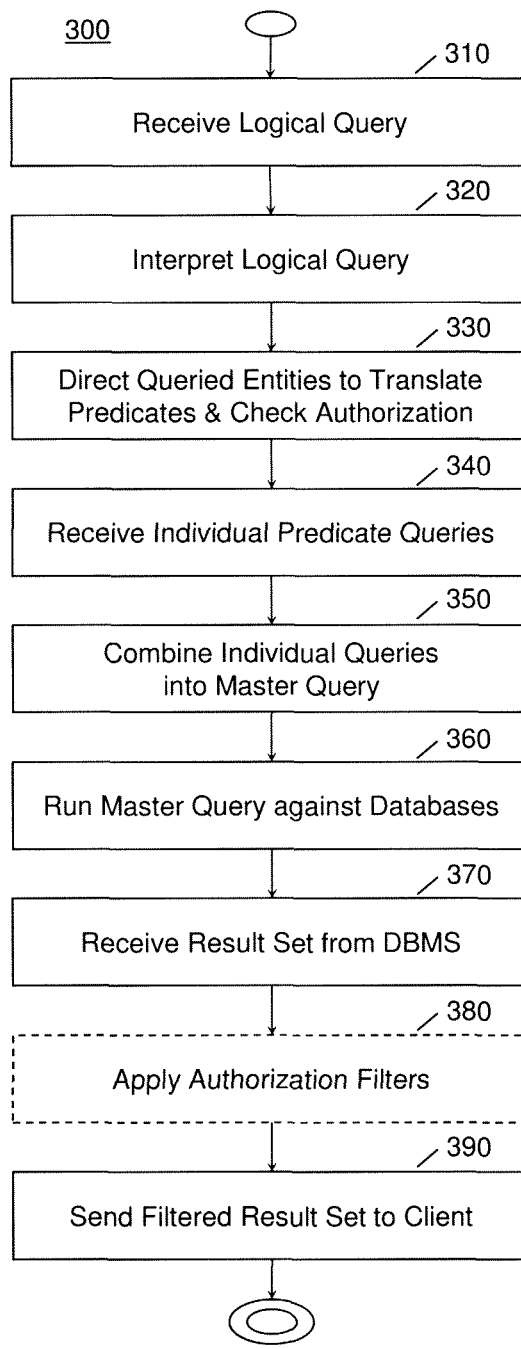
FIG. 3 is a flowchart depicting a process for executing a search query in a Master Data Management (MDM) system environment according to an embodiment of the present invention.

Generally, the search framework and API 10 that has been previously described performs the steps of FIG. 3. Referring now to FIG. 3, the reference numeral 300 generally designates a flow chart depicting a process for executing a search query in a Master Data Management (MDM) system. In step 310, the search framework and API 10 receives from the client a logical query written in an object-oriented query language, according to the pre-defined logical schema. In step 320, the search framework and API 10 interprets the logical query using the pre-defined logical schema to determine the physical entities that are the subject of the query (e.g., a particular database), any predicates specified for the determined entities, and the conjunctions and groupings (operators) specified between the determined predicates.

In step 330, the search framework and API 10 directs each of the queried entities to translate the determined predicates specified for it into a database-specific query language, such as SQL, and to build a predicate query that can be directly run against the physical data storage system. The search framework and API 10 also directs each entity to obtain authorization for the client to access the queried data, whereupon each MDM entity may communicate with the authorization system to perform this authorization check. If the appropriate authorization rule can be translated into a database-specific query (e.g., a SQL query), then the authorization query can be appended to the raw predicate query, otherwise the authorization rule can be transmitted as an authorization filter (e.g., a java filter) that is executed against the search result set before it is consumed by the client.

In step 340, the search framework and API 10 receives the individual predicate queries from each of the queried entities, along with any appended authorization queries or java filters. In step 350, the search framework and API 10 combines the individual predicate queries into a master query by appropriately nesting, grouping, performing union or intersection, or the like on the individual predicate queries. In step 360, the search framework and API 10 runs the master query against the physical data storage system, and in step 370 the search framework and API 10 receives a result set from the data storage system. If any authorization filters were received by the search framework and API 10, then in step 380 the search framework and API 10 applies these filters to the result set before, in step 390, sending the filtered result set to the client.

The search framework and API 10 also provides administration of queries and result sets to the system, for example storing query parameters, queries, and result sets in the memory. For example, the search framework and API 10 can provide the following API functionality:

SearchManager—a class for handling searches;

Searchable—a seachable interface is implemented by every MDM entity that needs to be available for searching;

SearchQuery—the Query object is used to specify a search query. This object accepts the search query as a string and allows the consumer of the API to specify some options for running the query;

SearchResult—the SearchResult object encapsulates the ResultSet of a query;

SearchResultIterator—the SearchResultIterator object allows the consumer of the search API to iterate over the ResultSet of a query in the SearchResult object;

SavedSearchParameter—the SavedSearchParameter object is used to store a list of personalized search parameters;

SavedSearchQuery—the SavedSearchQuery object is used to create a specific named query and store it in memory; and SavedSearchResult—the SavedSearchResult object allows the user to save the actual ResultSet of a particular query, along with any specified parameter values, and to specify a name for the set of objects.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. (Java™ is a trademark of Sun Microsystems, Inc.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of processing a query, comprising:
    providing a pre-defined logical schema to a user of a database system, wherein the pre-defined logical schema is mapped to at least two relational database entities of different databases storing data therein;
    receiving a logical query for data stored in the databases from the user, wherein the logical query is written in an object-oriented query language utilizing the pre-defined logical schema, and comprises two or more predicates and an operator specifying an action to take with one or more of the predicates;
    in response to receiving the logical query, interpreting the logical query using the pre-defined logical schema to determine which of the relational database entities is a subject of the logical query, and which of the relational database entities is associated with each predicate;
    requesting the database of each determined relational database entity of the logical query to:
        translate each of the associated predicates of that database in the logical query into a query language specific to that database, wherein at least two different databases translate an associated predicate; and
        apply an authorization rule with each of the associated predicates of that database in the logical query, wherein the authorization rule identifies unauthorized data:
    receiving a translated predicate query for each determined predicate of the logical query from its associated database of the relational database entity, wherein each translated predicate query is written in a relational query language specific to the associated database and is a translation of one of the object-oriented predicates in the logical query;
    combining each translated predicate query received from the databases of the determined relational database entities into a master query using the operator;
    executing the master query against the databases of the relational database entities that are subjects of the logical query;
    in response to executing the master query, receiving a query result set from the databases of the relational database entities that are subjects of the logical query; and
    providing the query result set to the user, wherein the query result set lacks the unauthorized data.

2. The method according to claim 1, wherein at least one of the steps is implemented on a computer system.

3. The method according to claim 1, further comprising:
    requesting the database of each relational database entity to check for authorization for each of its associated predicates;
    receiving the authorization rule for each predicate from its associated database of the relational database entity, wherein the authorization rule specifies unauthorized data and is written in the relational query language;
    wherein said combining further comprises combining the authorization rules with the translated predicate queries into the master query such that the received query result set does not contain any unauthorized data.

4. The method according to claim 1, further comprising:
    requesting the database of each relational database entity to check for authorization for each of its associated predicates;
    receiving the authorization rule including an authorization filter for each predicate from its associated database of the relational database entity, wherein the authorization filter specifies unauthorized data; and
    applying the received authorization filters to the received query result to remove unauthorized data prior to providing the query result set to the user.

5. The method according to claim 1, further comprising: saving the logical query in the database system.

6. The method according to claim 1, further comprising: saving the query result set in the database system.

7. The method according to claim 1, wherein the database system is a master database system.

8. The method according to claim 1, wherein the relational query language is SQL.

9. A computer program product comprising a computer useable memory device having a computer readable program stored thereon, wherein the computer readable program when executed on a computer causes the computer to:
    provide a pre-defined logical schema to a user of a database system, wherein the pre-defined logical schema is mapped to at least two relational database entities of different databases storing data therein;
    receive a logical query for data stored in the databases from the user, wherein the logical query is written in an object-oriented query language utilizing the pre-defined logical schema, and comprises two or more predicates and an operator specifying an action to take with one or more of the predicates;
    in response to receiving the logical query, interpret the logical query using the pre-defined logical schema to determine which of the relational database entities is a subject of the logical query, and which of the relational database entities is associated with each predicate;

request the database of each determined relational database entity of the logical query to:

translate each of the associated predicates of that database in the logical query into a query language specific to that database, wherein at least two different databases translate an associated predicate; and apply an authorization rule with each of the associated predicates of that database in the logical query, wherein the authorization rule identifies unauthorized data;

receive a translated predicate query for each determined predicate of the logical query from its associated database of the relational database entity, wherein each translated predicate query is written in a relational query language specific to the associated database and is a translation of one of the object-oriented predicates in the logical query;

combine each translated predicate query received from the databases of the determined relational database entities into a master query using the operator;

execute the master query against the databases of the relational database entities that are subjects of the logical query;

in response to executing the master query, receive a query result set from the databases of the relational database entities that are subjects of the logical query; and provide the query result set to the user, wherein the query result set lacks the unauthorized data.

10. The computer program product of claim 9, wherein the computer readable program when executed on a computer further causes the computer to:

request the database of each relational database entity to check for authorization for each of its associated predicates;

receive the authorization rule for each predicate from its associated database of the relational database entity, wherein the authorization rule specifies unauthorized data and is written in the relational query language;

wherein said combining further comprises combining the authorization rules with the translated predicate queries into the master query such that the received query result set does not contain any unauthorized.

11. The computer program product of claim 9, wherein the computer readable program when executed on a computer further causes the computer to:

request the database of each relational database entity to check for authorization for each of its associated predicates;

receive the authorization rule including an authorization filter for each predicate from its associated database of the relational database entity, wherein the authorization filter specifies unauthorized data; and apply the received authorization filters to the received query result to remove unauthorized data prior to providing the query result set to the user.

12. The computer program product of claim 9, wherein the computer readable program when executed on a computer further causes the computer to:

save the logical query in the database system.

13. The computer program product of claim 9, wherein the computer readable program when executed on a computer further causes the computer to:

save the query result set in the database system.

14. The computer program product of claim 9, wherein the database system is a master database system.

15. The computer program product of claim 9, wherein the relational query language is SQL.

16. The computer program product of claim 9, wherein the computer useable memory device is a computer useable optical storage medium.

17. The computer program product of claim 9, wherein the computer useable memory device is a hard disk.

18. A system comprising:

a memory having a pre-defined logical schema stored thereon; and a processor configured with logic to:

provide the pre-defined logical schema to a user of a database system, wherein the pre-defined logical schema is mapped to at least two relational database entities of different databases;

receive a logical query for stored data of the databases from the user, wherein the logical query is written in an object-oriented query language utilizing the pre-defined logical schema, and comprises two or more predicates and an operator specifying an action to take with one or more of the predicates;

in response to receiving the logical query, interpret the logical query using the pre-defined logical schema to determine which of the relational database entities is a subject of the logical query, and which of the relational database entities is associated with each predicate;

request the database of each determined relational database entity of the logical query to:

translate each of the associated predicates of that database in the logical query into a query language specific to that database, wherein at least two different databases translate an associated predicate; and apply an authorization rule with each of the associated predicates of that database in the logical query, wherein the authorization rule identifies unauthorized data;

receive a translated predicate query for each determined predicate of the logical query from its associated database of the relational database entity, wherein each translated predicate query is written in a relational query language specific to the associated database and is a translation of one of the object-oriented predicates in the logical query;

combine each translated predicate query received from the databases of the determined relational database entities into a master query using the operator;

execute the master query against the databases of the relational database entities that are subjects of the logical query;

in response to executing the master query, receive a query result set from the databases of the at least two relational database entities; and provide the query result set to the user, wherein the query result set lacks the unauthorized data.

19. The system of claim 18, the processor being further configured with the logic to:

request the database of each relational database entity to check for authorization for each of its associated predicates;

receive the authorization rule for each predicate from its associated database of the relational database entity, wherein the authorization rule specifies unauthorized data and is written in the relational query language;

wherein said combining further comprises combining the authorization rules with the translated predicate queries into the master query such that the received query result set does not contain any unauthorized data.

20. The system of claim 18, the processor being further configured with the logic to:
request the database of each relational database entity to check for authorization for each of its associated predicates;
receive the authorization rule including an authorization filter for each predicate from its associated database of the relational database entity, wherein the authorization filter specifies unauthorized data; and
apply the received authorization filters to the received query result to remove unauthorized data prior to providing the query result set to the user.

21. The system of claim 18, the processor being further configured with the logic to:
save the logical query in the database system.

22. The system of claim 18, the processor being further configured with the logic to:
save the query result set in the database system.

23. The system of claim 18, wherein the database system is a master database system.

24. The system of claim 18, wherein the relational query language is SQL.

* * * * *